(12) United States Patent
Lerman (10) Patent No.: US 10,949,669 B2
(45) Date of Patent: Mar. 16, 2021

(54) AUGMENTED REALITY GEOLOCATION USING IMAGE MATCHING

(71) Applicant: KreatAR, LLC, New York, NY (US)

(72) Inventor: Liron Lerman, New Brunswick, NJ (US)

(73) Assignee: KreatAR, LLC, New York, NY (US)

(*) Notice: Subject to any disclaimer, the term of this patent is extended or adjusted under 35 U.S.C. 154(b) by 0 days.

(21) Appl. No.: 16/108,830

(22) Filed: Aug. 22, 2018

(65) Prior Publication Data

US 2019/0065855 A1 Feb. 28, 2019

Related U.S. Application Data

(60) Provisional application No. 62/548,762, filed on Aug. 22, 2017.

(51) Int. Cl.
| | | |
|---|---|---|
| *G06K 9/00* | (2006.01) | |
| *G06T 19/00* | (2011.01) | |
| *G06T 7/70* | (2017.01) | |
| *G06F 16/29* | (2019.01) | |
| *G06F 16/583* | (2019.01) | |
| *G06T 7/73* | (2017.01) | |

(52) U.S. Cl.
CPC ......... *G06K 9/00671* (2013.01); *G06F 16/29* (2019.01); *G06F 16/583* (2019.01); *G06K 9/00677* (2013.01); *G06T 7/70* (2017.01); *G06T 7/74* (2017.01); *G06T 19/006* (2013.01)

(58) Field of Classification Search
CPC .. G06K 9/00671; G06K 9/00677; G06T 7/74; G06T 7/70; G06T 19/006; G06F 16/583; G06F 16/29
See application file for complete search history.

(56) References Cited

U.S. PATENT DOCUMENTS

| | | | |
|---|---|---|---|
| 2013/0243250 A1* | 9/2013 | France | G01C 15/00 382/103 |
| 2018/0089869 A1* | 3/2018 | Bostick | G06T 11/60 |

* cited by examiner

*Primary Examiner* — Chong Wu
(74) *Attorney, Agent, or Firm* — Fox Rothschild LLP (57) ABSTRACT

Disclosed is a system for determining high-precision geolocation. The system includes a user device having a camera, a non-transitory memory containing computer readable instructions, and a processor. The processor is configured to process the instructions receive live image content from the camera, receive information indicative of one or more device condition attribute that is associated with the user device, select a group of stored images based on the one or more stored image condition attribute, compare the live image content to the group of stored images, based on the comparing, select, from the group of stored images, one or more matching stored image that matches the live image content, and determine a high-precision geolocation of the user device based on the matching one or more stored image.

17 Claims, 9 Drawing Sheets

AUGMENTED REALITY GEOLOCATION USING IMAGE MATCHING

CROSS REFERENCE TO RELATED APPLICATIONS

The present application claims priority to U.S. provisional application No. 62/548,762 filed Aug. 22, 2017 entitled "AUGMENTED REALITY GEOLOCATION USING IMAGE MATCHING," which is hereby incorporated by reference in its entirety.

FIELD

The present invention relates to systems and methods for establishing high-precision geolocation using image matching techniques, and using the high-precision geolocation to present augmented reality.

BACKGROUND

In augmented reality (AR) presentations, a user device receives live image content of a real world environment, and an AR image object is overlaid on the real world environment for display. Existing methods of determining the geolocation of the user device do not provide a very high level of accuracy, as AR objects are typically located arbitrarily in on the device's screen. Therefore, needed is a way to determine a geolocation of a user device with high precision.

SUMMARY

Disclosed is a system for determining high-precision geolocation. The system includes a user device having a camera, a non-transitory memory containing computer readable instructions, and a processor. The processor is configured to process the instructions receive live image content from the camera, receive information indicative of one or more device condition attribute that is associated with the user device, select a group of stored images based on the one or more stored image condition attribute, compare the live image content to the group of stored images, based on the comparing, select, from the group of stored images, one or more matching stored image that matches the live image content, and determine a high-precision geolocation of the user device based on the matching one or more stored image.

In various embodiments, the processor can be configured to display an AR asset according to the high-precision geolocation. The one or more condition attribute can be indicative of one or more of: a general geolocation of the device, a tilt of the device, a heading of the device, an altitude of the device, environmental conditions surrounding the device, light quality of the live image content received from the camera; or the proximity of the device to a wireless access point. The processor can be configured to select the group of stored images by filtering the stored images based on a first device condition attribute, and filter the stored images again based on a second device condition attribute. In selecting the group of stored images, the processor can be configured to establish a target condition attribute that is equal to or within a predetermined range of the device condition attribute, and select stored images having stored image condition attributes corresponding to the target condition attribute.

Also disclosed is system for presenting augmented reality (AR) content. The system includes a camera, a non-transitory memory containing computer readable instructions, and a processor. The processor is configured to process the instructions to receive live image content from the camera, receive information indicative of the geolocation of the camera when live image content was taken, determine a general geolocation based on the received geolocation information, identify a plurality of stored images that have geolocational information corresponding to the general geolocation, compare the image content to the identified stored images, select one or more stored image that matches the live image content, determine a high-precision geolocation of the camera based on the matched one or more stored image, and display an AR asset according to the high-precision geolocation.

The processor can be configured to retrieve from a database the AR asset based on the high-precision geolocation. Also, the processor can be configured to modify the AR asset based on the high-precision geolocation of the camera, which can include altering the perspective projection of the AR asset. The processor can be configured to determine environmental conditions associated with the general geolocation, and use the environmental conditions to select the one or more stored image. The processor can be configured to determine the environmental conditions based on analyzing the live image content, or based on receiving information that is indicative of environmental conditions in the general geolocation. Also, the processor can be configured to determine at least one relative positioning property of the camera, the relative positioning properties including heading and an observer special attitude, and use the at least one relative positioning property to select the one or more stored image. The subject of the live image content can include a building, and the AR asset can correspond to a business in the building. In various embodiments, the general geolocation is determined with a global positioning system. The general geolocation can have a range error of eight meters, and the high-precision geolocation can have an error that is within one meter.

Also disclosed is a system for presenting augmented reality (AR) content, including a non-transitory memory containing computer readable instructions, and a processor. The processor can be configured to processes the instructions to receive, from a device associated with a camera, information indicative of a general geolocation of the device, identify a plurality of stored images that have geolocational information corresponding to the general geolocation, compare the image content to the identified stored images, based on the comparing, select, from the identified stored images, one or more stored image that matches the live image content, determine a high-precision geolocation of the camera based on the matching one or more stored image, retrieve an AR asset, and send the AR asset to the device. The device causes for display the AR asset according to the high-precision geolocation.

Also disclosed is a device for presenting augmented reality (AR) content, including a camera, a non-transitory memory containing computer readable instructions, and a processor. The processor is configured to process the instructions to receive live image content from the camera, receive information indicative of the geolocation of the camera when live image content was taken, determine a general geolocation based on the received geolocation information and a range error, transmit to a remote server information indicative of the general geolocation, in which the remote server compares the image content to a plurality of stored images to select one or more stored image that matches the live image content, receive the selected one or more stored image that matches the live image content, determine a high-precision geolocation of the camera based on the matching one or more stored image, transmit the high-precision geolocation, receive an AR asset, and displaying the AR asset according to the high-precision geolocation.

Also disclosed is a method for presenting augmented reality (AR) content. The method includes receiving, from a device associated with a camera, a general geolocation of the device and a range error, identifying a plurality of stored images that have geolocational information corresponding to the general geolocation, comparing the image content to the identified stored images, selecting one or more stored image that matches the live image content based on the comparing, determining a high-precision geolocation of the camera based on the matching one or more stored image, retrieving an AR asset, and sending the AR asset to the device. The device causes for display on a display the AR asset according to the high-precision geolocation.

In various embodiments, retrieving an AR asset includes retrieving the AR asset based on the high-precision geolocation. The method can further include modifying the AR asset based on the high-precision geolocation of the camera, which can include altering the perspective projection of the AR asset. The live image content can include an image content of a building, and the AR asset corresponds to a business in the building.

Also disclosed is a method for presenting augmented reality (AR) content, which includes receiving live image content from a camera, receiving information indicative of the geolocation of the camera when live image content was taken, determining a general geolocation based on the received geolocation information and a range error, transmitting information indicative of the general geolocation, receiving a plurality of stored images that have geolocational information corresponding to the general geolocation, comparing the image content to the identified stored images, based on the comparing, selecting one or more stored image that matches the live image content, determining a high-precision geolocation of the camera based on the matching one or more stored image, transmitting the high-precision geolocation, receiving an AR asset, and displaying the AR asset according to the high-precision geolocation.

Also disclosed is a system for presenting augmented reality (AR), including a camera, a non-transitory memory containing computer readable instructions, and a processor. The processor is configured to process the instructions to receive live image content from the camera, compare the image content to a group of stored images, based on the comparing, select one or more matching stored image that matches the live image content, determine a high-precision geolocation of the camera based on the matching one or more stored image, and display on an AR asset according to the high-precision geolocation.

In processor can further be configured to identify anchor points associated with the geolocation of the camera, determine the geolocation of the camera with respect to anchor points, and determine the display of the AR asset based on the relative geolocation of the camera with respect to the anchor points. Also, the processor can further be configured to select the group of stored images from a plurality of stored images that are stored in a database, the group being selected based on one or more condition attribute associated with the user device. The one or more condition attribute can be indicative of one or more of: a general geolocation of the device, a tilt of the device, a heading of the device, an altitude of the device, environmental conditions surrounding the device, light quality of the live image content received from the camera, or the proximity of the device to a wireless access point.

DETAILED DESCRIPTION

In providing an AR presentation, it is valuable to accurately determine the geolocation of the user device. For example, an appropriate AR object can be selected and presented according to a determined geolocation. Further, when the geolocation of the user device is determined to a high degree of precision, the display of the AR object can be positioned in the real world environment with better accuracy and placed precisely with respect to real-world objects in a live image of the device. While methods have been created for determining the geolocation of a user device, these methods typically lack accuracy and require substantial amount of processing power. A way is needed to determine a geolocation of a user device with high precision and with reduced processing requirements.

Disclosed are system and methods for establishing a geolocation of a user device to present augmented reality using image matching techniques. The image matching is achieved by comparing live image content received from the user device with a group of stored images.

Image matching requires significant processing power, and with a large number of stored images to be compared to a live image to identify one or more matches, the processing may become too slow to use adequately for AR in which the user's device may move around and aim in a different direction. The size of the group of stored images to be analyzed for a match can be reduced, however, to decrease the processing power required by selecting only images that are more likely to produce a match by selecting stored images that have associated therewith a target condition attribute. The value of the target condition attribute can be, for example, a value that matches or is within a predetermined range of a corresponding condition value of the device or of the live image, preferably at the time that the live image was taken, or recent with respect to that time.

For example, the condition attribute can be a general geolocation, such as of low or medium-precision, in which case the group of stored images can be selected from a larger group of stored images based on having been taken from a particular general geolocation associated with the live image or user device. The general geolocation can also be a recently calculated geolocation of the device, such as a high-precision geolocation that was determined recently, such as within the last few seconds or minutes. For instance, stored images are identified for inclusion in the selected group based on their having been taken with cameras that were within the same general geolocation as the user device when taking the live image. In this manner, only images that were taken nearby the known general geolocation are used for image matching, eliminating images that were taken at other locations and therefore would not produce correct matches.

Other condition attributes can be certain environmental conditions. For instance, the stored images can be selected based on their having been taken under similar weather conditions, luminance, time of day or year as the user device when taking the live image, or other environmental conditions that would be expected to affect the images.

The stored images can each be stored in a database with data tags associating the image to the condition attribute. In addition or as an alternative to data tags, the system processor can associate the stored images to condition attributes using a lookup table or using other suitable techniques. The system can determine the device condition attribute that is associated with the user device, and based thereon, select stored images that have similar data tags associated therewith. By selecting a group of stored images according to one or more condition attributes of the user device, the system filters the stored images that are used in the image matching process to reduce the number of images to be compared to the live image to identify a match, thereby improving the accuracy and reducing processing power.

Figure 1:
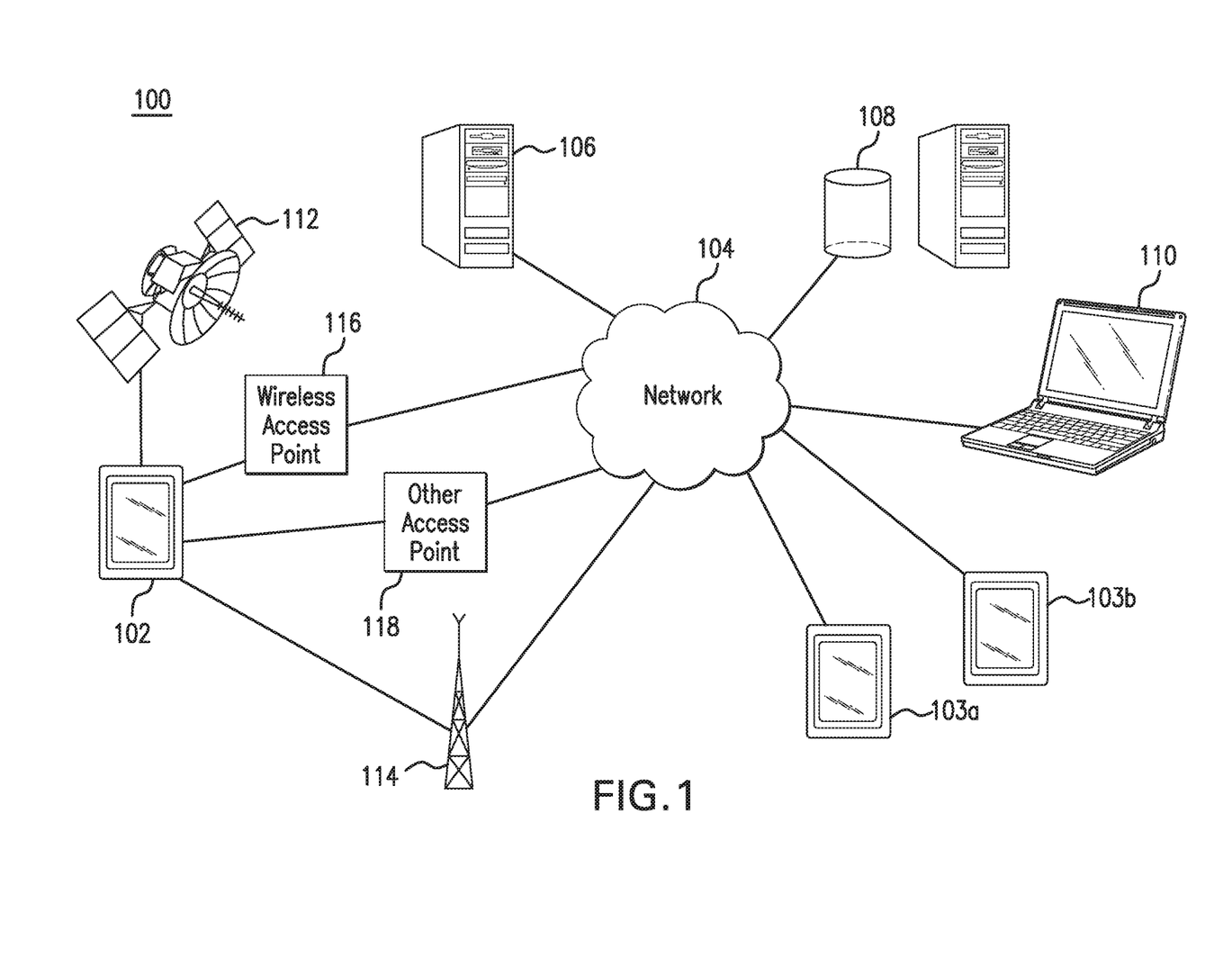
FIG. 1 is a diagram of a system for presenting augmented reality using image matching according to an embodiment.

Turning to the figures, systems and methods for presenting augmented reality using image matching will now be discussed. FIG. 1 is an image matching system 100 for performing image matching to determine a high-precision geolocation of a user device 102, and for presenting augmented reality content based on the high-precision geolocation. The user device 102 can be a tablet device, a mobile phone, such as a smartphone, or other suitable user device. The user device 102 includes a camera that receives live image content. The live image content can be two dimensional or three dimensional, and can comprise still images and/or video. The user device 102 can communicate with an image matching server 106 via the network 104. The user device can communicate with network 114, for example, by way of a wireless access point 116, a cellular cite 114, and/or by other suitable access points 118, such as Bluetooth or other connections.

Referring to FIG. 1, the image matching server 106 includes one or more processor that is communicatively coupled to at least one memory. The memory contains computer readable instructions that, when executed by the one or more processors, cause the one or more processors to perform a set of steps, some of the details of which will be explained in further detail below.

The image matching system 100 stores images that were taken at previous times, for example, in at least one database 108 for containing stored images. The stored images can be uploaded to the database 108 from other user devices 103*a*, 103*b* (e.g., from user devices 103*a*, 103*b* that recorded the stored images). The stored images can be stored with data tags associated with them and with information on condition attributes relating to when the images were taken, the details of which will be described below. While FIG. 1 shows the database 108 being a remote database (e.g., cloud-based database) communicatively coupled to the user device 102 and image matching server 106 via network 104, in some embodiments the database 108 can be stored in a local memory of the user device 102 and/or in a local memory of the image matching server 106.

A managing terminal 110 can be communicatively coupled to the image matching server 106 and/or the database 108 via network 104, for managing the system 100. For example, a manager of the system 100 can use terminal 110 to assign, modify, update, and/or confirm data tags associated with the images and/or AR assets stored in the database 108.

The AR presentation can be displayed according to various suitable methods, for example, on a display screen of a user device 102, or through a separate headset, focal lens, or other suitable device that is communicatively coupled to the user device 102.

The user device can have communication interfaces and/or sensors for detecting data that is indicative of a condition attribute of the user device 102. For example, the user device 102 can have a global positioning system (GPS) interface that communicates with a GPS satellite 112 to receive information indicative of a geolocation of the user device 102. The user device 102 can have a compass, magnetometer, or other sensor for detecting or determining the heading of the user device. The user device 102 can have an accelerometer, e.g., comprising piezoelectric sensors, for detecting movement of the user device 102. The accelerometer can also indicate tilt of the user device 102, including its pitch, roll, and yaw and position and/or movement about its pitch, roll, and yaw axes. The user device 102 can have a barometric pressure sensor or other sensors for detecting an altitude of the user device 102. The user device 102 can have a wireless network communication interface and can be configured to detect the proximity of the user device 102 to a wireless access point 116.

Additionally or alternatively, the system 100 can be configured to determine environmental conditions surrounding the device. The environmental conditions can be determined according to various suitable methods. In some cases, one or more of a processor in the user device 102 or a processor in the image matching server 106 (herein referred to as "the system processor") can be configured to analyze live image content received from the camera and determine the weather conditions associated with the live image content. For example, the system processor can detect whether the live image content includes rain, fog, snow, or the like, and/or the brightness of the live image content. Additionally or alternatively, the system processor can determine a general geolocation of the user device (e.g., by communicating with the GPS satellite 112), and receive information indicative of the environmental conditions within the general geolocation (e.g., by communicating with a weather information resources, such as the National Oceanic and Atmospheric Administration, which receives information from radar stations spread across the United States). Additionally or alternatively, the system processor can determine the lighting conditions surrounding the user device, for example, by receiving information from a clock associated with the user device (e.g., the user device can comprise a local clock).

The system processor uses one or more determined condition attribute to filter the plurality of stored images that are stored in the database 108, thereby reducing the number of stored images that will be compared to the live image during image matching. In filtering the stored images, the system processor selects, from the plurality of stored images, a group of stored images based on one or more condition attribute. The selected group of stored images is used to perform image matching, in which the system processor compares the live image content to the group of stored images, and selects one or more stored image that "matches" the live image content.

The system processor filters the stored images based on one or more determined condition attribute. To carry out the filtering, the stored images can be stored with data tags associating the image with one or more condition attribute of the stored image (stored image condition attribute). For example, the stored images can be stored with data tags indicating the general geolocation of the user device (e.g., 103a, 103b) that took the stored image. In selecting the group of stored images, the system processor determines the general geolocation of the user device; and then selects the stored images that have data tags indicating that the stored image was taken with a device within a predetermined proximity of the user device (e.g., within about eight meters of the live image content).

In selecting the group of stored images, the system processor can establish a target condition attribute, and identifies stored images that have stored image condition attribute corresponding to the target condition attribute. The target condition attribute can be established based on determining a condition attribute associated with the user device (device condition attribute). For instance, the device condition attribute can be a general geolocation of the user device. The system processor can determine this device condition attribute (e.g., by receiving GPS information from satellite) and establish a target condition attribute based thereon. The target condition attribute can be equal to or within a predetermined range of the device condition attribute. For example, the target condition attribute can be a general geolocation within an eight mile radius of the determined general geolocation of the user device. The system processor can then select stored images that have a stored image condition attribute corresponding to the target condition attribute (e.g., stored images that are stored with data tags indicating that the stored images were taken with devices located within an eight mile radius of the determined general geolocation of the user device).

In some cases, the stored images are filtered using the device heading as a condition attribute. In selecting the group of stored images, the system processor determines the heading of the user device as the device condition attribute; establishes a target condition attribute that is equal to or within a predetermined range of the device condition attribute (e.g., heading within five degrees of the device heading); and identifies stored images that have stored image condition attributes that correspond to the target condition attribute. For example, the system processor can select the stored images that have data tags indicating that the stored image was taken with a user device having a heading within a predetermined range of the user device (e.g., within five degrees of the user device).

As another example, the stored images can be filtered using altitude as a condition attribute. In selecting the group of stored images, the system processor determines the altitude of the user device as the device condition attribute; establishes a target condition attribute that is equal to or within a predetermined range of the device condition attribute; and identifies stored images that have stored image condition attributes that correspond to the target condition attribute. For example, the stored images can be stored with data tags indicating the altitude of the user device with which the stored image was taken. In selecting the group of stored images, the system processor determines the altitude of the user device; and then selects the stored images that have data tags indicating that the stored image was taken with a user device having a similar altitude.

As another example, the stored images can be filtered using tilt (e.g., the pitch of the user device) as a condition attribute. In selecting the group of stored images, the system processor determines the tilt of the user device as the device condition attribute; establishes a target condition attribute that is equal to or within a predetermined range of the device condition attribute; and identifies stored images that have stored image condition attributes that correspond to the target condition attribute. For example, the stored images can be stored with data tags indicating the tilt of the user device with which the stored image was taken (e.g., the pitch of the user device). In selecting the group of stored images, the system processor determines the pitch of the user device; and then selects the stored images that have data tags indicating that the stored image was taken with a user device having a similar pitch.

The stored images can be filtered using environmental conditions (e.g., weather conditions) as a condition attribute. In selecting the group of stored images, the system processor determines the environmental conditions surrounding the user device as the device condition attribute; establishes a target condition attribute that is equal to or within a predetermined range of the device condition attribute; and identifies stored images that have stored image condition attributes that correspond to the target condition attribute. For example, the stored images can be stored with data tags indicating associated environmental conditions (e.g., rain). In selecting the group of stored images, the system processor determines environmental conditions associated with the user device; and then selects the stored images that have data tags indicating that the stored image is associated with similar environmental conditions (e.g., rain). As another example, the condition attribute can be time of day, and the stored images can be stored with data tags indicating the time of day at which the stored image was taken. The system processor can determine the device condition attribute as the time of day of the device (e.g., based on receiving information from a local clock of the device), for example, 2:00 PM. The system processor can establish a target condition attribute based on the device condition attribute, for example, within an hour earlier or later than the device condition attribute; and can select stored images that have stored image condition attributes corresponding to the target condition attribute (e.g., stored images that have data tags indicating they were taken between 1:00 PM and 3:00 PM).

The system processor can filter the stored images based on any suitable number of condition attributes. For example, the system processor can determine a general geolocation, a heading, an altitude, and a pitch of the user device 102, and then select the stored images that have data tags indicating that the stored images was taken with a user device having a general geolocation within a certain proximity, as well as a heading, altitude, and pitch within a predetermined range.

The system processor can filter and select from among the stored images to compare at any suitable frequency, such as three times per second or more often if the processing power allows, once per second, or even once every several seconds or, if necessary, minutes. Renewed filtering or selection can happen alternatively or additionally upon significant changes in the device condition attribute. Also, the system processor can filter the plurality of stored images based on a plurality of condition attributes, or can switch from one type or types of condition attributes to another. For instance, general geolocation can be a first condition attribute used to select a first group of stored images, and then time of day can be used if the source of the device geolocation becomes unavailable to select a subsequent group to conduct a subsequent image matching, or alternatively the first group can be further filtered by using the time of day or other condition attribute.

In some embodiments, the system processor can analyze the device condition attributes of the live image content, to determine how to perform the filtering prior to the image matching. For example, if the live image content is not substantially bright (has low luminance) and/or if it is raining and snowing, then the image matching procedure is typically not as accurate, and can require more processing. Thus, the system processor can establish, based on the device condition attribute, the type and the degree of filtering that is performed prior to the image matching. For example, if the system processor determines that the live image content is dark and/or rainy, then the system processor will filter the stored images more than if it determines the live image content is bright and/or sunny. For example, upon determining that the live image content is dark and/or rainy, the system processor can filter the stored images based on geolocation, heading, pitch, and altitude. If, upon determining that the live image content is bright and/or sunny, the system processor can filter the stored images based on geolocation only.

Upon selecting the group of stored images, the system processor performs image matching. During the image matching, live image content that is received from the user device is compared to the group of stored images. Since the group of stored images is selected based on condition attributes of the user device (device condition attributes), the group of stored images are filtered to a limited number of stored images that are similar to the live image content. Further details of the image matching are described below with reference to FIGS. 8A-8B.

Upon selecting one or more matching stored image, the system processor determines a high-precision geolocation of the user device 102. Based on the high-precision geolocation of the user device 102, the system processor can retrieve an AR asset for display. For example, using the high-precision geolocation, the system processor can determine a subject of the live image content, and the perspective view of the subject that is received as live image content. For example, using the high-precision geolocation, the system processor can determine that the live image content contains a skyscraper as a subject, and can determine the perspective view of the skyscraper as it is received as live image content.

The system processor retrieves an AR asset based on the subject and the perspective view thereof. For example, the system processor can identify an AR asset associated with the skyscraper, and more particularly, to an AR asset associated with the perspective view of the skyscraper. The AR asset is displayed according to the high-precision geolocation.

Figure 2:
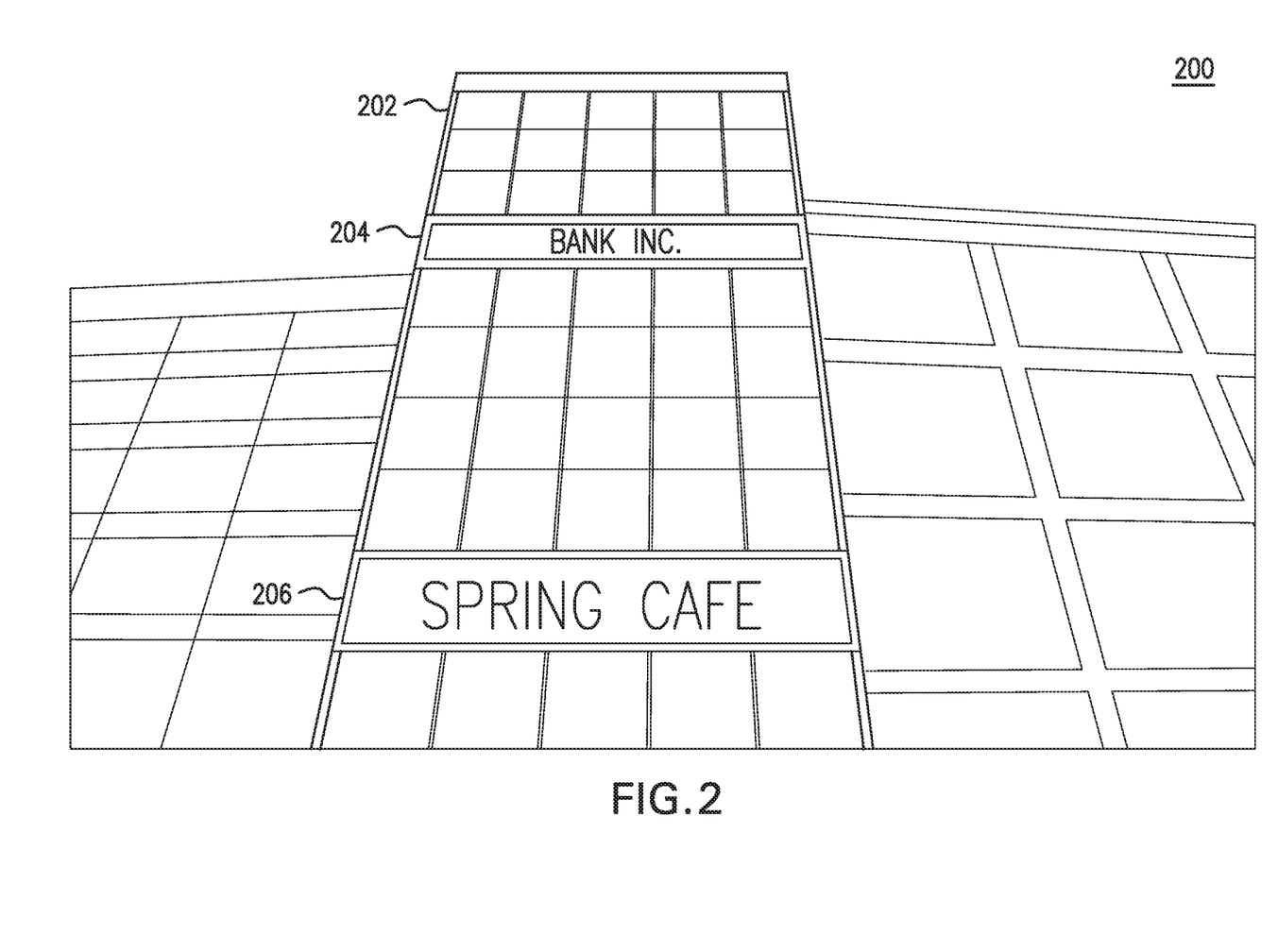
FIG. 2 is schematic representation of an exemplary augmented reality display, which may be presented with the system of FIG. 1.

As an example, FIG. 2 shows a schematic representation of an augmented reality display 200 that can be presented according to disclosed systems and methods. In the example, the real world environment contains a skyscraper 202 as a subject. Retrieved AR assets include a first advertisement banner 204 displayed outside of a bank that is located on an upper level of the building 202, and a second advertisement banner 206 associated with a restaurant that is located on a lower level of the building. As shown, the AR assets 204, 206 are overlaid on the real world environment according to the high-precision geolocation of the live image content. For example, because the geolocation of the user device can be determined with high specificity (e.g., within a meter of accuracy), the banners 202, 204 can be display in the location of the business within the building.

Figure 3:
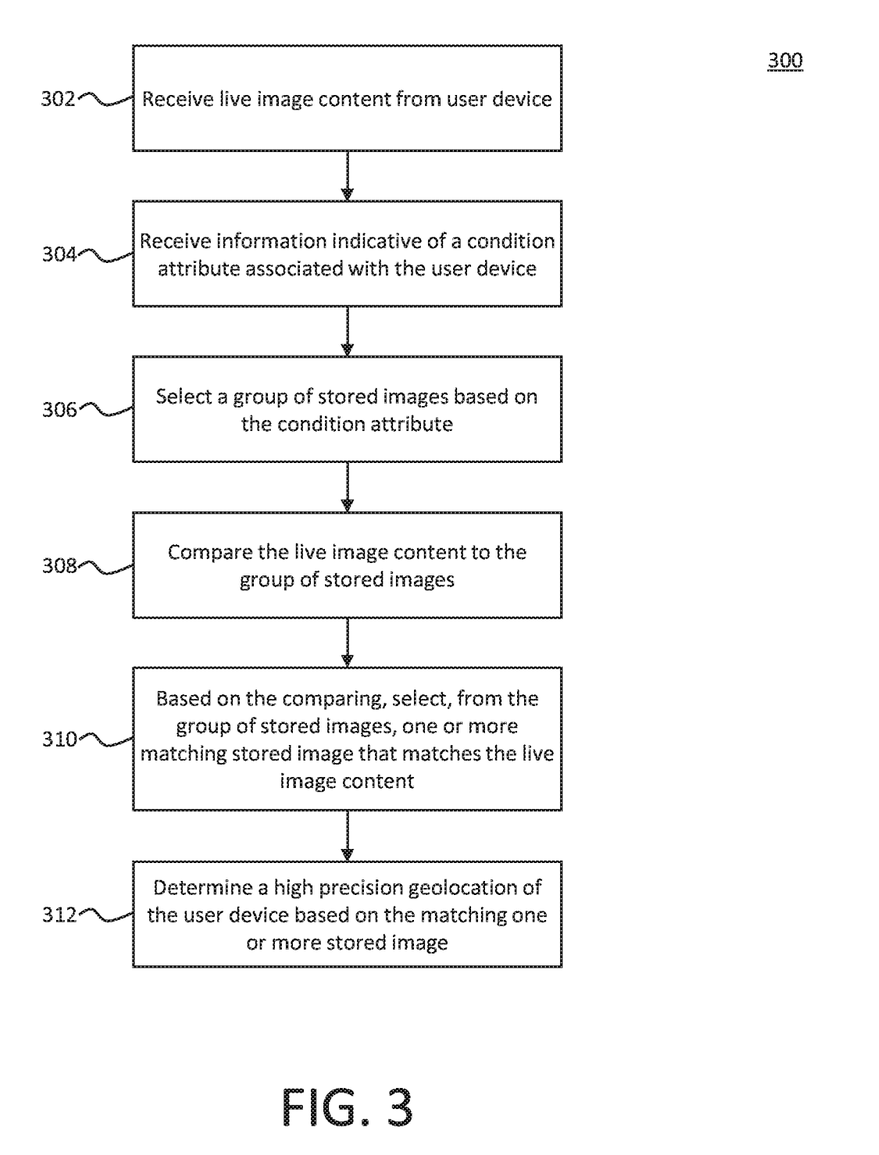
FIG. 3 is a flowchart of a process for determining a high precision geolocation of a user device, which may be performed by the system of FIG. 1.

FIG. 3 is a flowchart of a process for determining a precise geolocation of a user device. The process 300 can be carried out by the system processor, which as described above, includes one or more of the user device 102 or the image matching server 106. In step the user device 102 receives live image content. The live image content can be two dimensional or three dimensional, and can comprise sill images and/or video. In step 304, information is received that is indicative of a first condition attribute associated with the user device (first device condition attribute). For example, the device condition attribute can be a general geolocation of the user device (e.g., received from GPS satellite 112). In step 306, a group of stored images is selected based on the first device condition attribute and the stored image condition attributes associated with the stored images. In step 308, image matching is performed and the group of stored images is compared to the live image content. In step 310, based on the comparing, the system processor selects one or more matching stored image that "matches" the live image content. In step 312, the system processor determines a high-precision geolocation of the user device, based on the matching one or more image. For example, the stored images can be stored with information indicative of a high-precision geolocation (e.g., coordinate values); and the system processor can analyze this high-precision geolocation information of the "matching" images in order to determine the high-precision geolocation of the user device.

Figure 4:
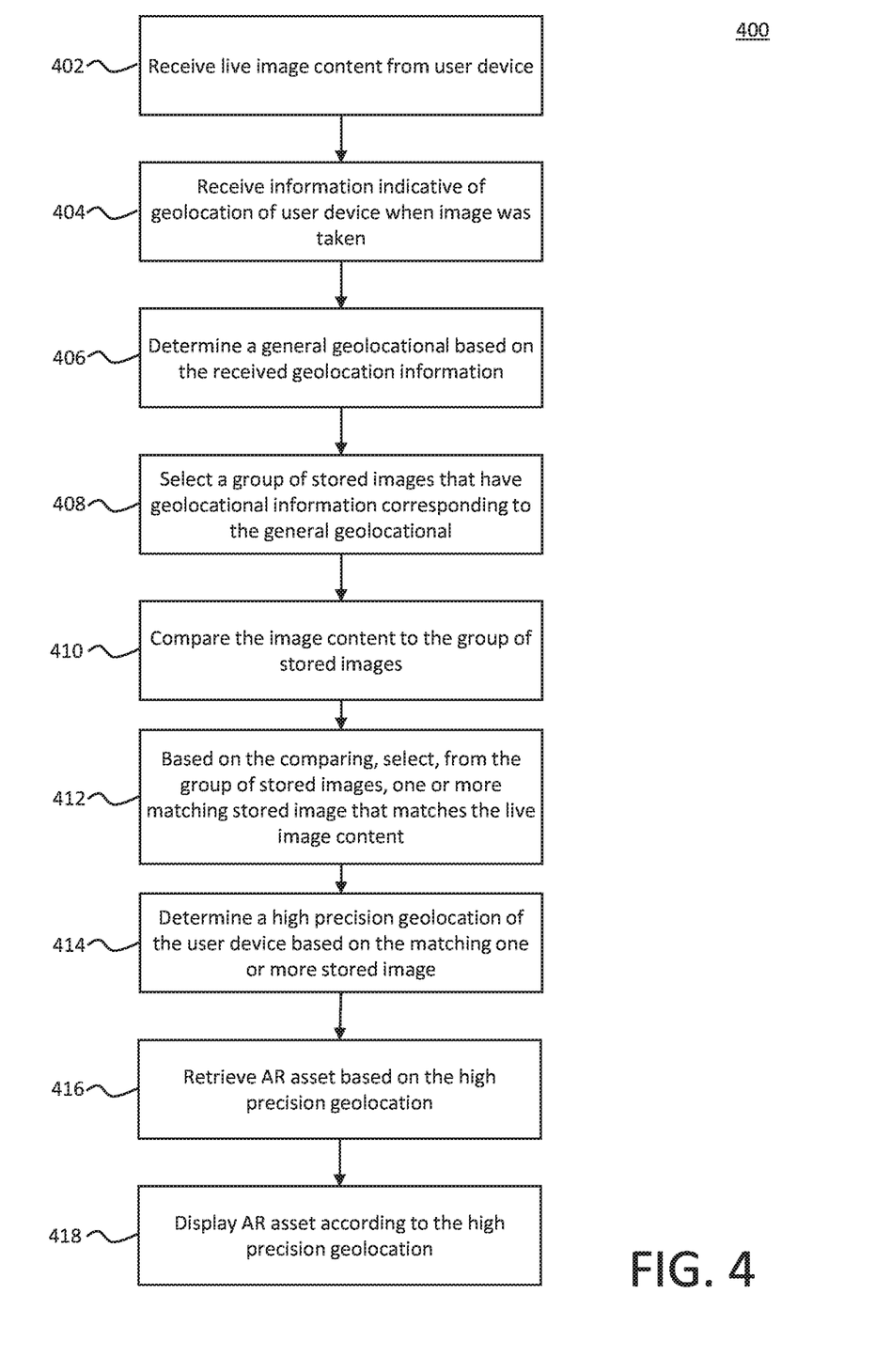
FIG. 4 is flowchart of a process for presenting augmented reality using image matching, which may be performed by the system of FIG. 1.

FIG. 4 is a flowchart of a process 400 for presenting augmented reality, which can be carried out by the system 100. The process 400 can be carried out by the system processor, which as described above, includes one or more of the user device 102 or the image matching server 106. In step 402, live image content is received from the camera at the user device 102. As described above, the live image content can be two dimensional or three dimensional, and can comprise sill images and/or video. In step 404, information is received that is indicative of a general geolocation of the user device 102. For example, system processor receives information from GPS satellite 112 that is indicative of a geolocation of the user device. In step 406, based on the received geolocation information, the system processor determines a first general geolocation and a range error. In some cases, the GPS information can have a range error of about eight meters; and thus the first general geolocation can be a geographical area having an eight meters radius.

In step 408, a group of stored images are selected that have geolocation information corresponding to the first general geolocation. In some embodiments, each of the selected stored images has an associated data tag associating the stored image with the first general geolocation. For example, the stored images can be stored in database 108 with data tags that indicate where the user device (e.g., 103*a*) was located when the stored image was taken. Thus, the system processor selects stored images that have data tags indicating that the stored image was taken within the first general geolocation (e.g., within the one eight meter radius). For example, each of the selected stored images has a data tag indicating that it was taken with a user device 103*a* located within the eight meter radius of the user device 102.

In steps 410 and 412, image matching is performed. In step 410, the selected stored images are compared with the live image content. Based on the comparing, in step 412, one or more stored images are selected that best match the live image content. The image matching is performed on a matching platform, which can be carried out by one or more of the user device 102, the image matching server 106, or a remote matching server. The image matching can be performed using various suitable methods. Further details of image matching are described below with reference to FIGS. 8A-8C.

In step 414, based on the one or more matching stored image, the system processor determines a high-precision geolocation of the user device 102. In step 416, based on the high-precision geolocation of the user device 102, the system processor retrieves an AR asset for display. For example, the system processor uses the high-precision geolocation to determine a subject of the live image content, and retrieves an AR asset based on the subject. In step 418, the AR asset is displayed according to the high-precision geolocation. For example, the AR asset can be overlaid over the real world subject according to the perspective view, and presented for display.

Figure 5:
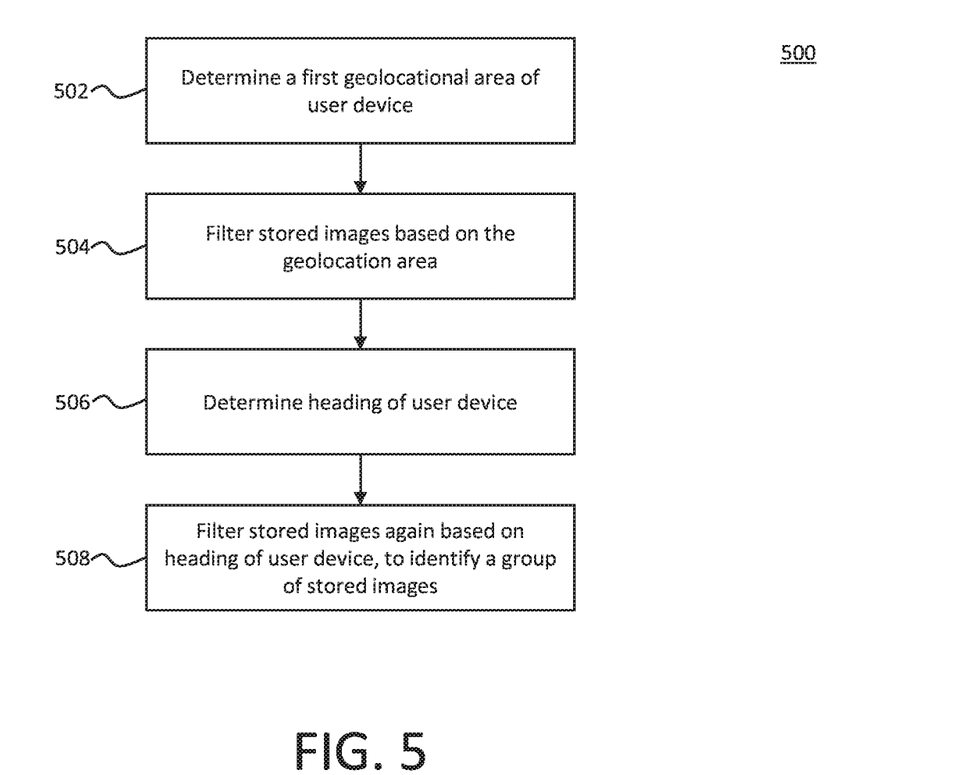
FIGS. 5 and 6 are flowcharts of processes for filtering stored images to select a group of stored images, which may be performed by the system of FIG. 1.

FIG. 5 is a flowchart of a process 500 for filtering the stored images to select a group of stored images, according to an embodiment. In step 502, the system processor determines a general geolocation of the user device 102. For example, the system processor can receive information from GPS satellite 112 that is indicative of a geolocation of the user device 102, and based thereon determine a first general geolocation. In step 504, the system processor filters the stored images based on the first geolocation. For example, the system processor can select the stored images that have data tags indicating that the stored image was taken with a device (e.g., 103a, 103b) within a predetermined proximity of the user device 102 (e.g., within a eight meter of the user device 102).

In step 506, the system processor determines a heading of the user device, for example, using information received from a magnetometer of the user device 102. In step 508, the system processor filters the stored images again based on the heading. For example, the system processor can identify a group of stored images by selecting the stored images that have data tags indicating that the stored images was taken with a device (103a, 103b) having a heading within a predetermined range of the user device 102 (e.g., within five degrees of the user device 102).

Figure 6:
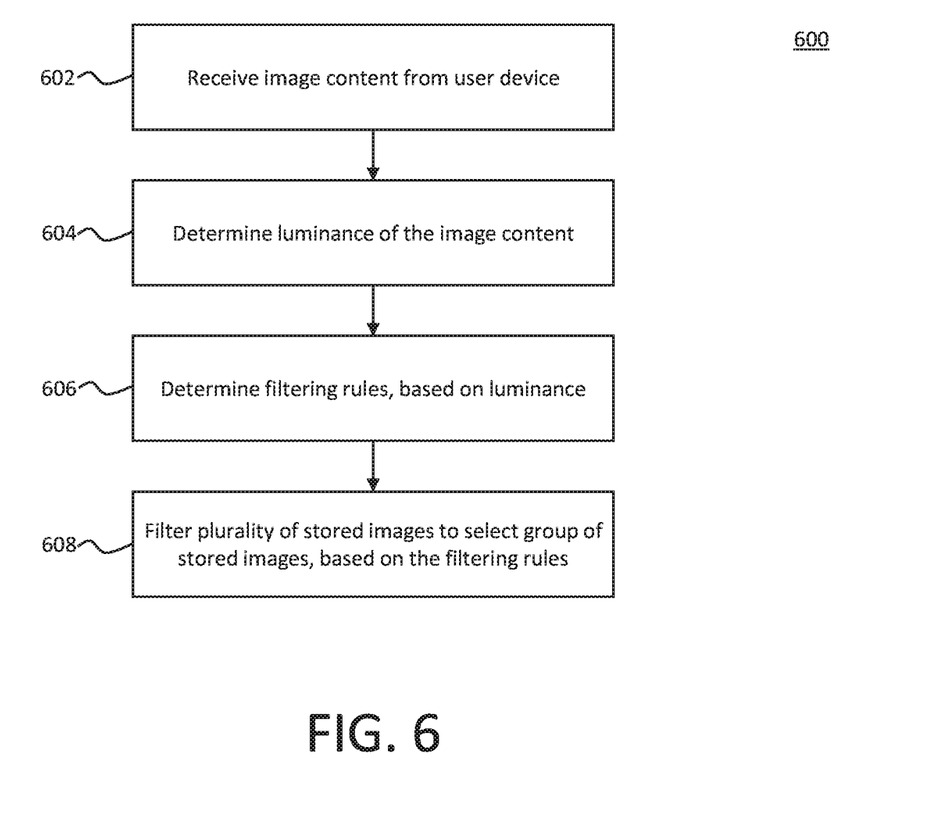

FIG. 6 is a flowchart of a process 600 for filtering the stored images to select a group of stored images, according to an embodiment. In step 602, the system processor receives image content from the user device 102. In step 604, the system processor determines the luminance of the image content. In step 606, the system processor determines filtering rules based on the luminance. As described above, if the luminance is relatively low, then the image matching procedure is typically not as accurate, and can require more processing. Thus, the system processor can use the luminance to establish filtering rules (e.g., the type and the degree of filtering that is performed prior to the image matching). If, in step 604, the system processor determines that luminance of the live image content is relatively low, then in step 606 the system processor will establish different filtering rules and filter the stored images more than if it determines the luminance is relatively high. For example, upon determining that the live image content has low luminance, the system processor can establish filtering rules for filtering the stored images based on geolocation, heading, as well as altitude. If, in step 604, the system processor determines that the luminance is relatively high, then in step 606 the system processor can establish filtering rules for filtering the stored images based on geolocation only. In step 608, the system processor filters the stored images according to the filtering rules, to select the group of stored images.

Figure 7:
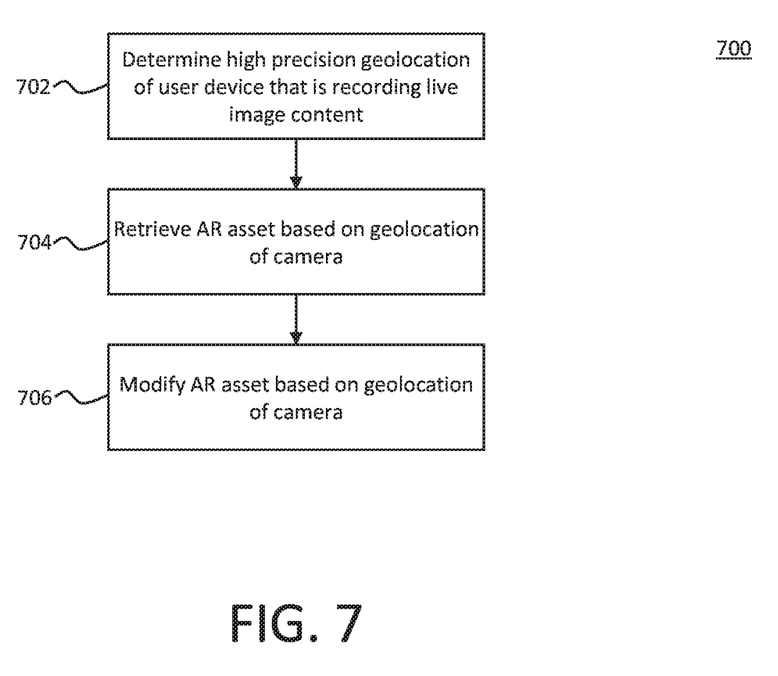
FIG. 7 is a flowchart of a process for retrieving and modifying an augmented reality asset, which may be performed by the system of FIG. 1.

FIG. 7 is a flowchart of a process 700 for modifying an AR asset based on a high-precision geolocation of the user device 102, according to an embodiment. In step 702, the high-precision geolocation of the user device 102 is determined, embodiments of which are explained above.

In step 704, an AR asset is retrieved based on the geolocation of the user device 102. In some embodiments, the AR assets are stored as files in a database (e.g., database 108) with data tags associated the AR assets with a precise geolocation. In retrieving the AR assets, the system processor selects AR assets having data tags that correspond to the high-precision geolocation of the device. For example, by performing image matching, the system processor establishes a high-precision geolocation of the user device, including a subject of the live video content and a perspective view. The AR assets are stored in the database with data tags corresponding to the high-precision geolocation. Thus, when retrieving the AR asset according to the data tags, the system processor selects an AR asset that corresponds to the subject and perspective of the user device 102. For example, referring to FIG. 2, the system processor retrieves the banners 204, 206 according to the subject (the skyscraper) and the perspective view of the businesses located within the skyscraper (e.g., the bank is located at an angle higher than the restaurant). In some embodiments, the system processor can retrieve AR assets according to environmental conditions associated with the user device. For example, daytime and evening versions of the banner asset 204 can be stored; and the system processor can select the appropriate version based on determining the time of the user device (e.g., the user can comprise a clock).

In step 706, the AR asset is modified based on the geolocation of the user device 102. For example, the AR asset can be modified according to the perspective of the user device. Additionally or alternatively, the AR asset can be modified according to environmental conditions associated with the user device. For example, if the system processor determines that it is raining at the geolocation of the user device, then the system processor will modify the AR asset to make it appear that it is raining in the AR asset as well.

In some embodiments, the AR assets contain anchors, and are displayed according to the anchors. For example, the AR assets can have anchor points relative to geolocation of the user device and/or relative to the live image content. In overlaying the AR asset onto the real world environment, the system processor places the AR asset according to the anchor points.

Figure 8A:
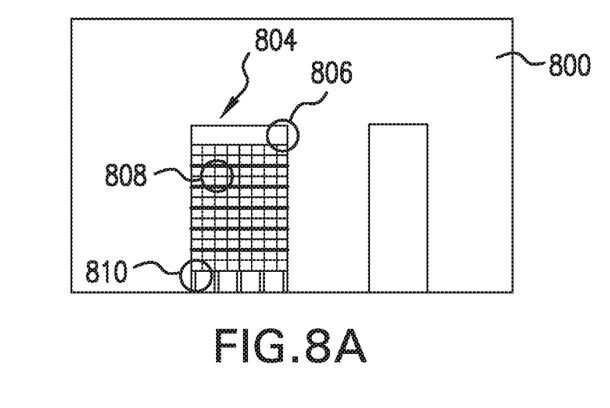
FIGS. 8A-8C are schematic representations of stored images and a live image that can be used to perform image matching.
Figure 8B:
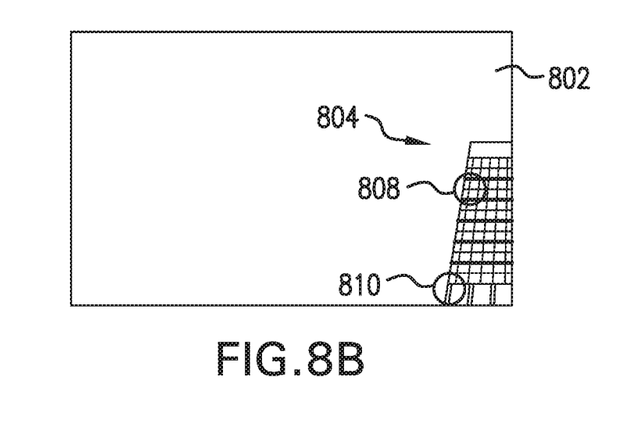
Figure 8C:
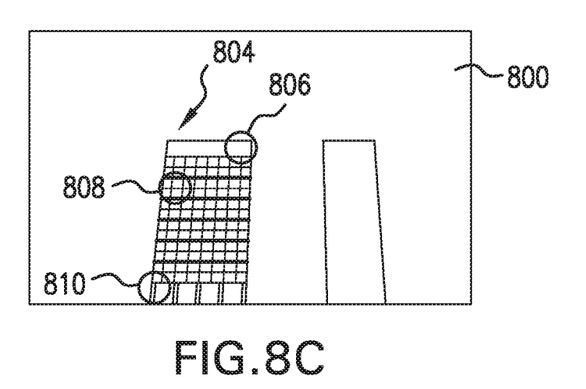

The image matching process can be performed according to various suitable methods. In some embodiments, the image matching is performed using image targets. For example, the stored images are stored in the database 108 with image targets associated with them. The image targets are detectable by the matching platform. The image targets can correspond to features of the building. For example, FIGS. 8A and 8B show schematic representations of stored images 800, 802 a building 804 and three image targets that correspond to features of the building 804: the features being a corner 806, window pattern 808, and entrance 810. FIG. 8C shows a schematic representation of live image content 812. When the matching platform receives live image content, it scans the live image content for features corresponding to the stored image targets 806, 808, 810. The matching platform detects in the live image content 812 features 814, 816, 818 that correspond to the stored image targets 806, 808, 810. As shown in FIG. 8C, the live image content 812 has a corner 814, which the platform would identify as corresponding to target 806; window pattern 816, which the platform would identify as corresponding to target 808; and entrance 818, which the platform would identify as corresponding to target 810. Based on the detection, the matching platform identifies the one or more stored images 800, 802 associated with the stored image targets 806, 808, 810.

The image matching can be performed based on the number of image targets that correspond to the detected features in the lived image content. In such cases, a stored image will be determined as "matching" the live image content based on the number of image targets corresponding to the detected features in the live image content.

In some embodiments, one stored image is selected as "matching". For example, the stored image with the highest number of corresponding image targets is determined as the match. In other embodiments, more than one stored image are selected as "matching". For example, the two stored images with the highest number of corresponding image targets are determined as matches. In some cases, stored images are determined as matches according to a valuation threshold. For example, stored images will be selected as "matching" if they have a predetermined number of image targets that correspond to the detected features in the lived image content. In such cases, a stored image will be determined as "matching" the live image content if it has a predetermined number of image targets corresponding to the detected features in the live image content.

In cases in which two or more stored images are selected as matching images, further processing can be performed on the matching images for geolocation and/or AR placement. In some embodiments, upon the matching platform selecting a plurality of matching stored images, the matching stored image that has highest number of matching image targets is selected as the matching image. In some embodiments, the matching platform averages the values for features of the plurality of matching images. For example, if two matching images both have a building as a subject but are taken from slightly different perspective views, then the lengths and/or angles of the building edges can be averaged. In some embodiments, the matching platform selects one of the plurality of matching images at random.

Figure 9:
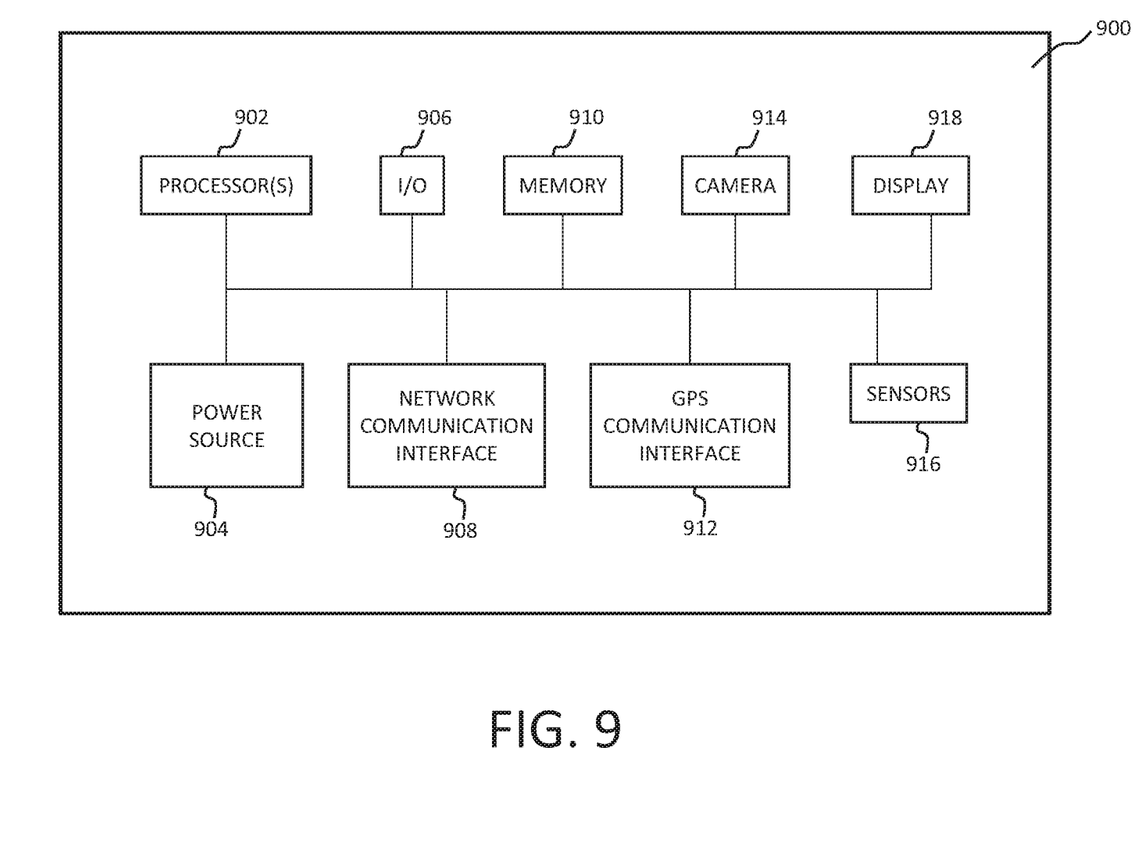
FIG. 9 is a simplified block diagram of a computing device that may be used with the system of FIG. 1.

FIG. 9 is a simplified block diagram of a computing device 900, such as a user device, and/or image matching server, which may be used with the system of FIG. 1. Device 900 need not include all of the components shown in FIG. 9 and described below. For example, one or more of the device 900 need not include an interface 908, 912, display 918, camera 914, or sensors 916.

The computing device 900 may include one or more processing elements 902, an input/output interface 906, one or more memory components 910, a camera 914, a display 918, a power source 904, a networking/communication interface 908, a GPS communication interface 912 and/or one or more sensors 912 in communication with each other via one or more systems busses or via wireless transmission means, each of the components will be discussed in turn below.

The one or more processing elements may be substantially any electronic device capable of processing, receiving, and/or transmitting instructions. For example, the processing element may be a microprocessor or a microcomputer.

Additionally, it should be noted that the processing element may include more than one processing member. For example, a first processing element may control a first set of components of the computing device and a second processing element may control a second set of components of the computing device, where the first and second processing elements may or may not be in communication with each other, e.g., a graphics processor and a central processing unit which may be used to execute instructions in parallel and/or sequentially.

The input/output interface allows the computing device to receive inputs from a user and provide output to the user. For example, the input/output interface may include a capacitive touch screen, keyboard, mouse, camera, stylus, or the like. The type of devices that interact via the input/output interface may be varied as desired. Additionally, the input/output interface may be varied based on the type of computing device used. Other computing devices may include similar sensors and other input/output devices.

The memory stores electronic data that may be utilized by the computing device. For example, the memory may store electrical data or content, for example audio files, video files, document files, and so on, corresponding to various applications. The memory may be, for example, non-volatile storage, a magnetic storage medium, optical storage medium, magneto-optical storage medium, read only memory, random access memory, erasable programmable memory, flash memory, or a combination of one or more types of memory components.

The display may be separate from or integrated with the computing device. For example, for cases in which the computing device is a smart phone or tablet computer, the display may be integrated with the computing device and in instances where the computing device is a server or a desktop computer the display may be separate from the computing device. The display provides a visual output for the computing device and may output one or more graphical user interfaces (GUIs). The display may be a liquid display screen, plasma screen, light emitting diode screen, and so on. The display may also function as an input device in addition to displaying output from the computing device. For example, the display may include capacitive touch sensors, infrared touch sensors, or the like that may capture a user's input to the display.

The power source provides power to the various components of the computing device. The power source may include one or more rechargeable, disposable, or hardwire sources, e.g., batteries, power cord, or the like. Additionally, the power source may include one or more types of connectors or components that provide different types of power to the computing device. The types and numbers of power sources may be varied based on the type of computing devices.

The networking/communication interface receives and transmits data to and from the computing device. The networking/communication interface may transmit and send data to the network, other computing devices, or the like. For example, the networking/communication interface may transmit data to and from other computing devices through the network which may be a wireless network (Wi-Fi, Bluetooth, cellular network, etc.) or a wired network (Ethernet), or a combination thereof. In particular, the network may be substantially any type of communication pathway between two or more computing devices. For example, the network may be wireless, wired, or a combination thereof. Some examples of the network include cellular data, Wi-Fi, Ethernet, Internet, Bluetooth, closed-loop network, and so on. The type of network 114 may include combinations of networking types and may be varied as desired.

The sensors may provide substantially any type of input to the computing device 200. For example, the sensors may be one or more accelerometers, microphones, global positioning sensors, gyroscopes, light sensors, image sensors (such as cameras), force sensors, and so on. The type, number, and location of the sensors 916 may be varied as desired and may depend on the desired functions of the system.

Any and all references specifically identified in the specification of the present application are expressly incorporated herein in their entirety by reference thereto. The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. A system for presenting augmented reality (AR) content, comprising:
    a camera;
    a non-transitory memory containing computer readable instructions; and
    a processor configured to process the instructions to carry out the following steps:
        receive live image content from the camera;
        receive information indicative of a general geolocation of the camera when live image content was taken;
        determine the general geolocation based on the received information indicative of the general geolocation information;
        identify a plurality of stored images that have geolocational information corresponding to the general geolocation;
        determine environmental conditions corresponding to an atmospheric condition at the general geolocation;
        compare the image content to the identified stored images;
        based on the comparing and the environmental conditions, select, from the identified stored images, one or more stored images that match the live image content;
        determine a high-precision geolocation of the camera based on the matched one or more stored image, the high-precision geolocation have a higher precision than the general geolocation; and
        display, based on the high-precision geolocation and a perspective view of the camera, an AR asset on the live image content from the camera.

2. The system of claim 1, further comprising retrieving from a database the AR asset based on the high-precision geolocation.

3. The system of claim 2, wherein the processor is configured to modify the AR asset based on the high-precision geolocation of the camera.

4. The system of claim 3, wherein modifying comprises altering the perspective projection of the AR asset.

5. The system of claim 3, wherein modifying the AR asset comprises modifying the AR asset based on a real-time condition associated with the camera.

6. The system of claim 1, wherein the processor is configured to determine the environmental conditions based on at least one of the following:
    analyzing the live image content; or
    information that is indicative of environmental conditions in the general geolocation.

7. The system of claim 1, further comprising repeating the identifying step upon occurrence of at least one of the following:
    a threshold change in the general geolocation of the camera; or
    expiration of a time period.

8. The system of claim 1, wherein the processor is configured to:
    determine at least one relative positioning property of the camera, the relative positioning properties including heading and an observer special attitude; and
    use the at least one relative positioning property to select the one or more stored image.

9. The system of claim 1, wherein the processor is configured to:
    determine an altitude of the camera; and
    use the altitude to select the one or more stored image.

10. The system of claim 1, wherein the general geolocation is determined with a global positioning system.

11. The system of claim 1, wherein the processor is further configured to:
    identify anchor points associated with the AR asset;
    determine a relative geolocation of the camera with respect to the anchor points; and
    determine a display of the AR asset based on the relative geolocation of the camera with respect to the anchor points.

12. The system of claim 1, wherein the environmental conditions comprise current weather conditions associated with the live image content.

13. The system of claim 1, wherein the environmental conditions comprise a current time of day or of year associated with the live image content.

14. A method for presenting augmented reality (AR) content, comprising:
    receiving, from a device associated with a camera, a general geolocation of the device and a range error;
    identifying a plurality of stored images that have geolocational information corresponding to the general geolocation;
    determining environmental conditions corresponding to an atmospheric condition at the general geolocation;
    comparing the image content to the identified stored images;
    based on the comparing and the environmental conditions, selecting, from the stored images, one or more stored image that matches the live image content;
    determining a high-precision geolocation of the camera based on the matching one or more stored image, the high-precision geolocation have a higher precision than the general geolocation;
    retrieving an AR asset; and
    sending the AR asset to the device, wherein the device causes for display on a display the AR asset according to the high-precision geolocation and a perspective view of the camera.

15. The method of claim 14, wherein retrieving an AR asset comprises retrieving the AR asset based on the high-precision geolocation.

16. The method of claim 14, further comprising modifying the AR asset based on the high-precision geolocation of the camera and modifying comprises altering the perspective projection of the AR asset.

17. The method of claim 14, further comprising modifying the AR asset based on a real-time condition associated with the camera.

\* \* \* \* \*